United States Patent Office 3,041,372
Patented June 26, 1962

3,041,372
3-(ETHYNYL/VINYL-3-HYDROXY - 3a - METHYL-7-OXOPOLYHYDROBENZ[e]INDANES AND ESTERS THEREOF
Leland J. Chinn, Morton Grove, Ill., assignor to G. D. Searle & Co., Chicago, Ill., a corporation of Delaware
No Drawing. Filed Mar. 5, 1959, Ser. No. 797,345
7 Claims. (Cl. 260—488)

This invention relates to 3-(ethynyl/vinyl)-3-hydroxy-3a-methyl-7-oxopolyhydrobenz[e]indanes and esters thereof, as also to processes whereby these products can be manufactured. More particularly, this invention relates to compounds of the formula

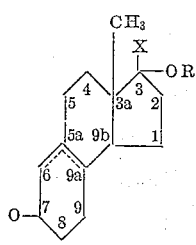

wherein X represents an ethynyl or vinyl radical, R represents hydrogen or an alkanoyl radical, and the dotted line represents a double bond in either the 5a(6) or 5a(9a) position.

Among the alkanoyl radicals comprehended by R in the foregoing formula, especially lower alkanoyl radicals are preferred, which is to say groupings of the formula —CO-lower alkyl wherein the lower alkyl constituent is such as methyl, ethyl, propyl, isopropyl, butyl, isobutyl, sec-butyl, tert-butyl, pentyl, isopentyl, tert-pentyl, neopentyl, hexyl, isohexyl, heptyl, octyl, and like $C_nH_{2n+1}$ aggregates in which $n$ represents a positive integer amounting to less than 9.

The products to which this invention relates are useful because of their valuable pharmacological properties. Thus, for example, they are diuretics—from which it follows that the intermediates whence these products can be manufactured are likewise useful.

The following examples describe in detail certain of the compounds illustrative of the present invention, and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter set forth, temperatures are given in degrees centigrade and relative amounts of materials in parts by weight, except as otherwise noted.

Example 1

(A) *3 - hydroxy - 7 - methoxy - 3a - methyl - 3a,4,5,6,9,9b-hexahydrobenz[e]indane.*—To a solution of 1 part of 3-hydroxy-7-methoxy-3a-methyl-3a,4,5,9b - tetrahydrobenz[e]indane [synonym: trans-1β-hydroxy-8-methyl-4,5-(4'-methoxybenzo)hydrindane] in a mixture of 35 parts of anhydrous ether and 40 parts of tert-butyl alcohol is added, with agitation, 80 parts of anhydrous liquid ammonia. Approximately 1 part of lithium wire is then introduced in small increments, whereupon the blue reaction mixture is let stand for 80 minutes and then cautiously diluted with 4 parts of methyl alcohol, agitation being continued throughout. The ammonia is then evaporated and the gelatinous residue taken up in a mixture of ether and water. The ethereal phase is separated and successively washed with water and a saturated aqueous solution of sodium chloride. The resultant solution is dried over anhydrous sodium sulfate and stripped of solvent by evaporation. The residue, recrystallized from heptane, melts at 92.5–94°. The colorless dense crystalline material thus obtained is 3-hydroxy-7-methoxy-3a-methyl-3a,4,5,6,9,9b-hexahydrobenz[e]indane, of the formula

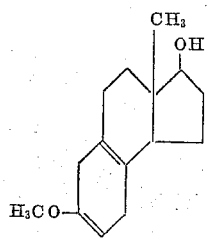

(B) *7 - methoxy - 3a - methyl - 3 - oxo - 3a,4,5,6,9,9b-hexahydrobenz[e]indane.*—To a solution of 30 parts of cyclohexanone and 6 parts of 3-hydroxy-7-methoxy-3a-methyl-3a,4,5,6,9,9b-hexahydrobenz[e]indane in 195 parts of dry toluene at the boiling point under reflux in a nitrogen atmosphere is added, with agitation during 5 minutes, a solution of 6 parts of aluminum isopropoxide in approximately 70 parts of dry toluene. Agitation at the boiling point under reflux is continued thereafter for 1 hour, at which point the resultant mixture is cooled and diluted with approximately 60 parts of a saturated aqueous solution of Rochelle salt. Excess cyclohexanone is then removed by steam distillation, following which the pale yellow solid precipitated in the distilland is collected on a filter, rinsed thereon with water, and dried in vacuo over sodium hydroxide. The 7-methoxy-3a-methyl-3-oxo-3a,4,5,6,9,9b-hexahydrobenz[e]indane thus obtained is crystallized from hexane, using decolorizing charcoal in process. The product comes out as dense white crystals melting at 97–99°. It has the formula

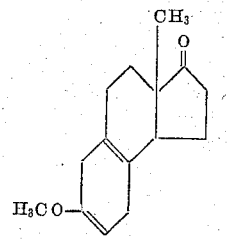

(C) *3-ethynyl-3 - hydroxy-7-methoxy-3a-methyl-3a,4,5,6,9,9b-hexahydrobenz[e]indane.*—To a solution of 34 parts of potassium in 640 parts of anhydrous tert-butyl alcohol under nitrogen is added 180 parts of dry toluene. The resultant mixture is cooled to roughly 0–5° and saturated thereat with acetylene, whereupon a solution of 34 parts of 7-methoxy-3a-methyl-3-oxo-3a,4,5,6,9,9b-hexahydrobenz[e]indane in 180 parts of dry toluene is mixed in. A moderate stream of acetylene is then passed over the surface of the mixture at 0° for 6 hours, during which time vigorous agitation is continuously maintained. The mixture is then diluted with water and thereupon extracted with ether. Removal of solvent from the ether extract by distillation leaves a residue which crystallizes from hexane as a dense material melting at 112–113°. This material is the desired 3-ethynyl-3-hydroxy-7-methoxy-3a-methyl-3a,4,5,6,9,9b-hexahydrobenz[e]indane, of the formula

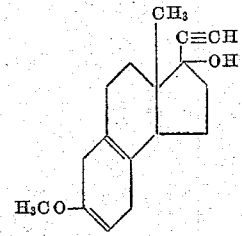

(D) *3-ethynyl-3-hydroxy-3a-methyl-7-oxo-3a,4,5,6,7,8,9,9b-octahydrobenz[e]indane.*—A solution of approximately 6 parts of 3-ethynyl-3-hydroxy-7-methoxy-3a-methyl-3a,4,5,6,9,9b-hexahydrobenz[e]indane and 3 parts of oxalic acid dihydrate in a mixture of 120 parts of methyl alcohol and 30 parts of water is let stand at room temperatures for 1 hour, whereupon 1 part of sodium carbonate monohydrate is introduced. The resultant mixture is extracted with ether, and the ethereal extract in turn washed with successive portions of water and a saturated aqueous solution of sodium bicarbonate. The extract is then dried over anhydrous sodium sulfate and stripped of solvent by evaporation. The residue is the $\beta,\gamma$-unsaturated ketone, 3-ethynyl-3-hydroxy-3a-methyl-7-oxo-3a,4,5,6,7,8,9,9b-octahydrobenz[e]indane, of the formula

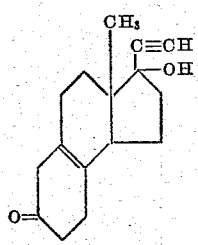

Example 2

*3-ethynyl-3-hydroxy-3a-methyl-7-oxo-3a,4,5,7,8,9,9a,9b-octahydrobenz[e]indane.*—To approximately 27 parts of 3-ethynyl-3-hydroxy-7-methoxy-3a-methyl-3a,4,5,6,9,9b-hexahydrobenz[e]indane is added 12 parts of concentrated hydrocholric acid, 10 parts of water and 120 parts of methyl alcohol. The resultant mixture is maintained at room temperatures with agitation for 3 hours in an atmosphere of nitrogen. It is then diluted with a large volume of water and distilled in vacuo until removal of the methyl alcohol is effected. The mixture is then extracted with ethyl acetate, and the resultant extract is successively washed with water and a saturated aqueous solution of sodium chloride. The extract is next dried over anhydrous sodium sulfate and, finally, is distilled to dryness under reduced pressure. The residue, crystallized from acetone, affords the desired $\alpha,\beta$-unsaturated ketone, 3-ethynyl-3-hydroxy-3a-methyl-7-oxo-3a,4,5,7,8,9,9a,9b-octahydrobenz[e]indane, as colorless massive dense crystals melting at 188–189.5°. The product has the formula

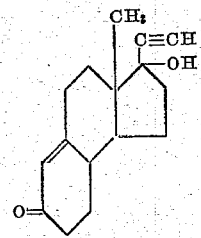

The same product results when 3-ethynyl-3-hydroxy-3a-methyl-7-oxo-3a,4,5,6,7,8,9,9b-octahydrobenz[e]indane is substituted for 3-ethynyl-3-hydroxy-7-methoxy-3a-methyl-3a,4,5,6,9,9b-hexahydrobenz[e]indane in the foregoing procedure.

Example 3

*3-acetoxy-3-ethynyl-3a-methyl-7-oxo-3a,4,5,7,8,9,9a,9b-octahydrobenz[e]indane.*—A mixture of 11 parts of 3-ethynyl-3-hydroxy-3a-methyl-7-oxo-3a,4,5,7,8,9,9a,9b-octahydrobenz[e]indane, 30 parts of pyridine, and 30 parts of acetic anhydride is maintained with agitation at 78° for 2 days. The mixture is then poured into ice-water, precipitating an oil which is induced to solidify on standing. The solid product is collected on a filter, washed thereon with water, and recrystallized from a mixture of ether and pentane. There is obtained by this means as colorless rods, 3-acetoxy-3-ethynyl-3a-methyl-7-oxo-3a,4,5,7,8,9,9a,9b-octahydrobenz[e]indane melting at 167–168.5°. The product has the formula

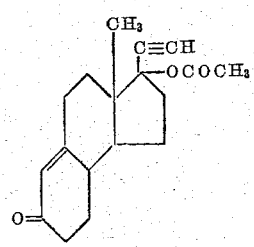

Example 4

*3-hydroxy-3a-methyl-7-oxo-3-vinyl-3a,4,5,7,8,9,9a,9b-octahydrobenz[e]indane.*—To a solution of 2 parts of 3-ethynyl-3-hydroxy-3a-methyl-7-oxo-3a,4,5,7,8,9,9a,9b-octahydrobenz[e]indane in a mixture of 100 parts of dioxane and 20 parts of pyridine is added 1 part of 5% palladium-on-calcium carbonate catalyst. The resultant mixture is reduced by agitation under hydrogen at atmospheric pressure. When the uptake of hydrogen indicates conversion of the ethynyl to a vinyl linkage (representatively, after ½ hour), the reduction is stopped and the catalyst removed by filtration. Solvent is stripped from the filtrate by vacuum distillation, leaving a viscous oil which is taken up in ether. The ether extract is washed with a 5% solution of hydrochloric acid, water, and saturated aqueous sodium chloride, in that order. The extract is then dried over anhydrous sodium sulfate and stripped of solvent by evaporation. The residue, crystallized from a mixture of ether and pentane, affords the desired 3-hydroxy-3a-methyl-7-oxo-3-vinyl-3a,4,5,7,8,9,9a,9b-octahydrobenz[e]indane as colorless needles melting at 102.5–104.5°. The product has the formula

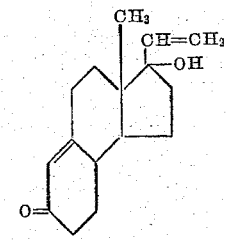

Example 5

*3a-methyl-7-oxo-3-propionyloxy-3-vinyl-3a,4,5,7,8,9,9a,9b-octahydrobenz[e]indane.*—A solution of 3 parts of 3-hydroxy-3a-methyl-7-oxo-3-vinyl-3a,4,5,7,8,9,9a,9b-octahydrobenz[e]indane in a mixture of 3 parts of p-toluene sulfonic acid monohydrate, 50 parts of propionic acid, and 50 parts of propionic anhydride is maintained at room temperatures for 16 hours in an atmosphere of nitrogen. The solution is then poured into a mixture of ice and water, precipitating an oil which is extracted with ether. The ether extract is washed successively with water, an aqueous 5% soltuion of sodium bicarbonate, water again, and a saturated aqueous solution of sodium chloride. It is then dried over anhydrous sodium sulfate and stripped of solvent by evaporation. The residue thus obtained is 3a-methyl-7-oxo-3-propionyloxy-3-vinyl-3a,4,-5,7,8,9,9a,9b-octahydrobenz[e]indane, of the formula

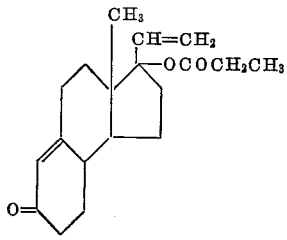

What is claimed is:
1. A compound of the formula

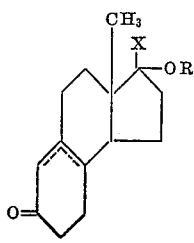

wherein X is selected from the group consisting of ethynyl and vinyl radicals, R is selected from the group consisting of hydrogen and lower alkanoyl radicals, and the dotted line represents a double bond in solely 1 of the positions 5a(6) and 5a(9a).

2. 3 - ethynyl - 3 - hydroxy - 3a - methyl - 7 - oxo - 3a,-4,5,6,7,8,9,9b-octahydrobenz[e]indane.

3. 3 - ethynyl - 3 - hydroxy - 3a - methyl - 7 - oxo - 3a,-4,5,7,8,9,9a,9b-octahydrobenz[e]indane.

4. 3 - acetoxy - 3 - ethynyl - 3a - methyl - 7 - oxo - 3a,4,-5,7,8,9,9a,9b-octahydrobenz[e]indane.

5. 3 - hydroxy - 3a - methyl - 7 - oxo - 3 - vinyl - 3a,4,5,-7,8,9,9a9b-octahydrobenz[e]indane.

6. 7 - methoxy - 3a - methyl - 3 - oxo - 3a,4,5,6,9,9b-hexahydrobenz[e]indane.

7. 3 - ethynyl - 3 - hydroxy - 7 - methoxy - 3a - methyl-3a,4,5,6,9,9b-hexahydrobenz[e]indane.

No references cited.